Nov. 1, 1966 F. C. CRAWFORD 3,282,549
REAR VISION TRUCK MIRROR ASSEMBLY
Filed Oct. 15, 1964 2 Sheets-Sheet 1
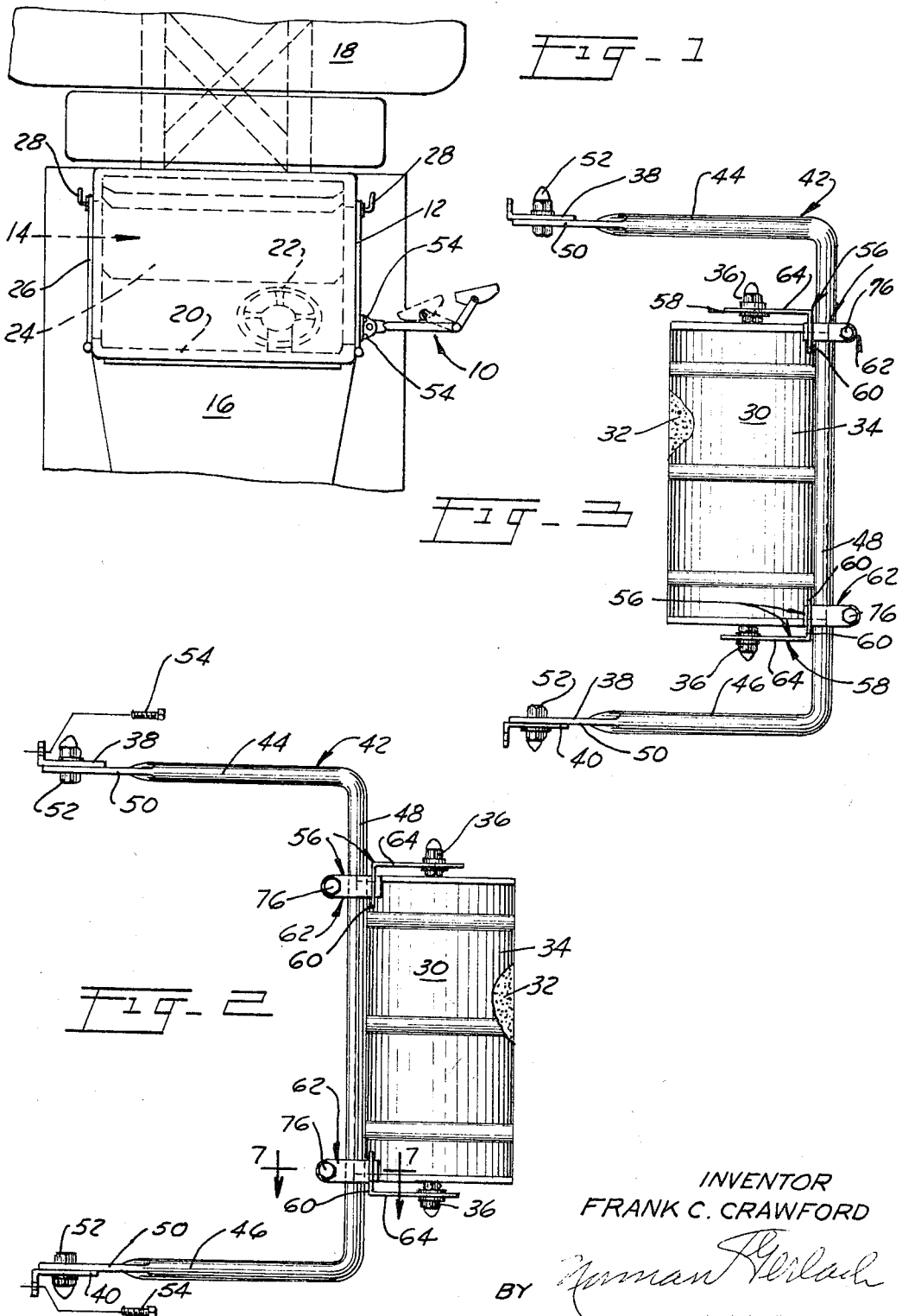
INVENTOR
FRANK C. CRAWFORD
BY
ATTORNEY Nov. 1, 1966     F. C. CRAWFORD     3,282,549
REAR VISION TRUCK MIRROR ASSEMBLY
Filed Oct. 15, 1964     2 Sheets-Sheet 2
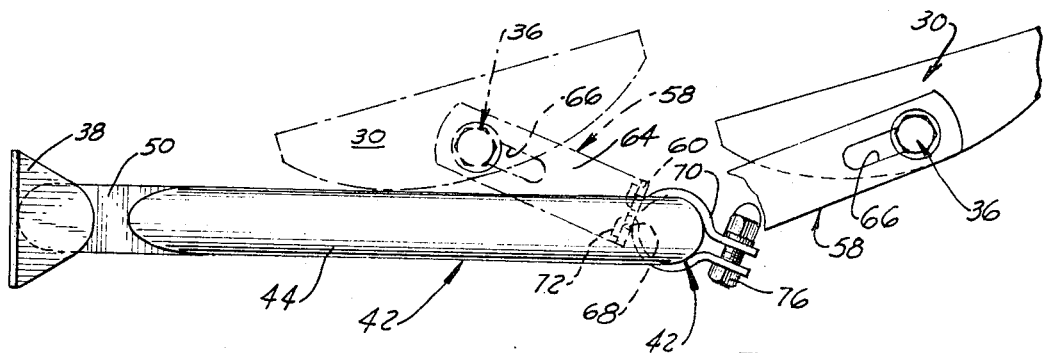
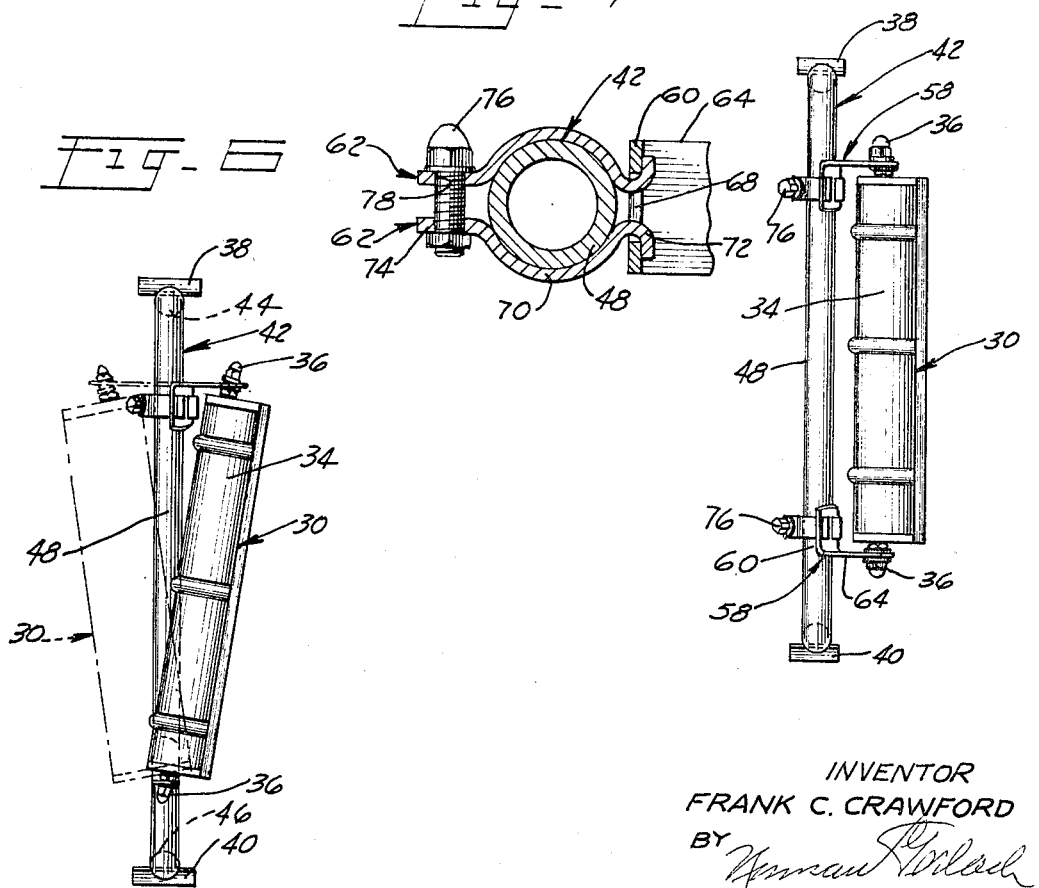
INVENTOR
FRANK C. CRAWFORD
BY
ATTORNEY

United States Patent Office 3,282,549
Patented Nov. 1, 1966

3,282,549
REAR VISION TRUCK MIRROR ASSEMBLY
Frank C. Crawford, Chicago, Ill., assignor to Monarch Tool & Machinery Co., Chicago, Ill., a corporation of Illinois
Filed Oct. 15, 1964, Ser. No. 403,996
4 Claims. (Cl. 248—276)

The present invention relates generally to automotive rear vision mirror structures and more particularly to a novel form of positionable rear vision mirror assembly which is designed for use especially in connection with a commercial truck of the "pick-up" or similar type, or a tractor-trailer combination, the assembly being, in each instance, mounted on the power-driven vehicle, i.e., the truck or tractor.

Ordinarily, in a tractor-trailer combination, the width of the trailer exceeds the width of the tractor by a considerable margin so that a rear vision mirror setting which is correct for the driver of the tractor when he is "bobtailing," i.e., when he is operating the tractor without the trailer, is incorrect for him when the trailer is being pulled. There are thus two normal rear vision mirror settings or adjustments which will effectively accommodate the driver in both instances, bearing in mind, of course, the fact that for each trailer picked up by a given tractor there ordinarily will be a slightly different mirror adjustment, and also the fact that different drivers will require different mirror settings both when bobtailing and hauling.

Inasmuch as, in commercial practice, the trailer of a tractor-trailer combination is usually picked up by the tractor in the warehouse yard or at a warehouse loading and unloading platform, proper mirror adjustments are not made at the moment of departure. Usually they are made after the driver has reached a stretch of straight road and while he is in motion thereon.

In a tractor-trailer combination, when the trailer is attached to the tractor, it usually is necessary for proper rear vision that the mirror be laterally displaced from the driver's cab an appreciable distance. As a result of this, it is frequently necessary for the driver to pull in the mirror to clear objects which he is approaching, or to clear such objects as, for example, when he enters a narrow passageway or drives around a corner or a close building. After a situation of this character has been met, it becomes necessary for the driver to readjust the mirror for proper rear vision and to do this the driver must again wait a stretch of straight road.

With these considerations in mind, it is obvious that a rear vision mirror assembly which is designed for a tractor-trailer combination or the like is subject to frequent adjustment and, therefore, it is essential for driver convenience that it be easily adjustable by a driver when he is in motion and, moreover, that such ease of adjustment be maintained both when the mirror is in close proximity to the driver's cab and when it is extended therefrom. It is also essential that movement of the mirror proper between its extended position and its retracted position prior to final adjustment may conveniently be made by the driver while in motion. It is it such a rear vision mirror assembly that the present invention specifically relates.

It is, therefore, among the principal objects of the present invention to provide a rear vision mirror assembly which is designed for use with a tractor-trailer combination or the like and, after initial and proper installation upon a tractor or truck cab, assumes a position well within the convenient reach of the driver; which is of such articulated design that a mirror proper or mirror frame that is associated therewith and forms a part thereof may be manipulated by the driver while in motion between its extended and retracted positions and, thereafter, in either position further manipulated to a finally adjusted position, all in one operation, i.e., by one handling of the mirror frame and without release thereof until final adjustment has been made; in which the mirror frame is capable of positioning during such adjustment in any intermediate position between its fully extended and its fully retracted positions; in which the mirror frame is infinitely adjustable both in azimuth as well as in elevation; and in which the mirror frame is capable of adjustment for height, such adjustment usually being made at the time of initial installation of the mirror assembly and remaining a permanent one.

It is a further object of the invention to provide a rear vision mirror assembly of the type under consideration and in which the various parts thereof are comprised of readily available stock materials including steel tubing, steel strip stock which is formed into small stampings, and conventional items of hardware such as threaded bolt and nut assemblies.

The provision of a rear vision mirror assembly which is comprised of relatively few parts, particularly moving parts and, therefore, is unlikely to get out of order; one which is rugged and durable and will, therefore, withstand rough usage; one which is capable of ease of assembly and dismantlement for purposes of inspection of parts, replacement or repair thereof; one in which all the necessary adjustments may be made manually and without the aid of special tools; one which is attractive in its appearance and pleasing in its design; and one which, otherwise, is well adapted to perform the services required of it, are further desirable features which have been borne in mind in the production and development of the present invention.

In the accompanying two sheets of drawings forming a part of this specification, one illustrative embodiment of the invention has been shown.

In these drawings:

FIG. 1 is a fragmentary top plan view of a tractor-trailer combination showing the improved rear vision mirror assembly of the present invention operatively applied to the driver's entrance door of the tractor cab, the mirror frame being disposed in its extended position;

FIG. 2 is an enlarged rear view of the assembly;

FIG. 3 is an enlarged rear view similar to FIG. 2 but showing the mirror frame in its retracted position;

FIG. 4 is an enlarged top plan view of the structure that is shown in FIG. 3;

FIG. 5 is an outside side elevational view of the structure that is shown in FIG. 3;

FIG. 6 is an outside end elevational view similar to FIG. 5 but showing the mirror in an inclined position of elevational adjustment; and FIG. 7 is an enlarged longitudinal sectional view taken on the line 7—7 of FIG. 2.

Referring now to the drawings in detail and in particular to FIG. 1, a rear vision mirror assembly constructed in accordance with the principles of the present invention has been designated in its entirety by the reference numeral 10 and it is shown as being operatively installed upon the driver's entrance door 12 of the cab 14 of an automotive tractor 16, the latter constituting the control and motivating section of a tractor-trailer combination including a trailer 18. The rear vision mirror assembly serves to permit the driver of the combination to view objects on the highway in back of the tractor, with or without the trailer attached thereto. The tractor-trailer combination may be of any conventional design and, as clearly shown in FIG. 1, the width of the trailer 18 is somewhat greater than the width of the cab 14 of the tractor 16. The latter is equipped with the usual driver's operating equipment and appointments including, among other things, an instrument panel 20, a steering wheel 22 and a driver's seat 24. In addition to the driver's entrance door 12, the cab 14 is provided with a passenger's door 26, both doors being window-equipped and having suitable operating handles 28. The rear vision mirror assembly 10 is shown in FIG. 1 as being mounted on the driver's entrance door 12, but it will be understood that it may, with or without modification as required, be applied to the door 26 or some other part of the cab 14.

The rear vision mirror assembly 10 involves in its general organization certain elements which are of a well-known construction and design and have become standardized in the industry so that they constitute the basic parts of numerous assembly designs. One of such parts is the mirror proper 30 which usually is referred to as the mirror frame and comprises the usual silvered glass mirror element 32 (see FIGS. 2 and 3). The later extends across a generally rectangular backing plate 34 of dished streamline design, the mirror element being coextensive with the front frame opening. Nut and bolt assemblies 36 at the top and bottom of the backing plate establish vertically aligned trunnion supports for the mirror frame 30 and permit pivotal adjustment of the mirror frame about a vertical axis, all in a manner that will be made clear presently. Other conventional parts employed in connection with the mirror assembly 10 are upper and lower angle brackets 38 and 40 by means of which the mirror assembly 10 as a unit is secured to the driver's entrance door 12.

In addition to the above-mentioned conventional parts, the mirror assembly 10 of the present invention includes a generally C-shaped supporting bracket or yoke 42 having upper and lower parallel horizontal yoke arms 44 and 46 and a vertical connecting bight portion 48. The yoke 42 is formed of steel tube stock and the free ends of the arms 44 and 46 are flattened as at 50, thus providing attachment ears which are secured by clamping nut and bolt assemblies 52 to the brackets 38 and 40, the latter in turn being secured by fastening screws 54 to the driver's entrance door 12. The clamping nut and bolt assemblies 52 preferably are adjusted to permit swinging movement of the yoke 42 in a horizontal plane, such movement being frictionally retarded to such an extent that, when the yoke is in an extended position wherein it assumes a position normal to the side of the tractor 16, the pressure of wind against the assembly 10 will not disturb the position thereof, while at the same time, a reasonable degree of manual torque applied to the yoke 42 will serve to move it for positioning purposes as will be made clear presently.

The mirror frame 30 is adjustably supported on the vertical bight portion 48 of the yoke 42 by means of upper and lower clamping and supporting assemblies 56 of identical construction. Each assembly includes an L-shaped support 58 having a short vertically extending leg 60 which is mounted on the vertical bight portion 48 by means of a pair of clips 62, and a long horizontally extending leg 64 having a longitudinal slot 66 therein for sliding reception therethrough of the bolt part of one of the nut and bolt assemblies 36. The short leg 60 of each support 58 has formed therein a longitudinal slot 68 (see FIG. 7) for reception of the clips 62, these clips each consisting of a short strip of flat ribbon stock having an arcuate section 70, an outturned reentrant hook portion 72 and a flat end portion 74. The arcuate sections 70 of the two clips straddle the vertical bight portion 48 of the yoke 42 and the two hook portions 72 pass through the slot 68. A clamping nut and bolt assembly 76 has the bolt portion thereof projecting through holes 78 in the flat end portions 74 of each pair of clips and when tightened the two hook portions 72 are spread apart within the slot 68 and the ends of the slot constitute reaction points for the inward pressure which is applied to the vertical tubular bight portion 48 of the yoke 42. The two clamping and supporting assemblies 56 thus, in effect, constitute elongated, radial supporting arms which are capable of swinging movement about the vertical bight portion 48.

It is to be noted at this point that in the initial installation of the mirror frame 30 on the vertical bight portion 48 of the supporting bracket or yoke 42, the nut and bolt assemblies 76 are tightened, as are the nut and bolt assemblies 52, only sufficiently that the mirror frame 30 will be self-supporting at a given desired elevation along the vertical bight portion 48 of the yoke 42 and have no tendency to creep downwardly on this bight portion under the influence of gravitational forces when vibration is encountered due to normal operations of the tractor 16, or to swing bodily about the vertical axis of the bight portion 48 under the influence of wind resistance against the mirror frame 30 when the tractor 16 is moving at high speeds. Adjustment of the nut and bolt assemblies 76 is preferably such that the driver of the tractor may manipulate the mirror frame 30 in a manner that will be made clear presently, to cause the entire assembly including the mirror frame and the upper and lower clamping supporting assemblies 56 to swing bodily about the vertical axis of the bight portion 48. The nut and bolt assemblies 36 are similarly tightened to prevent involuntary motion of the mirror frame while permitting manual turning thereof about the vertical axis of the two trunnion supports that are afforded by the nut and bolt assemblies 36.

During initial installation of the mirror assembly 10 upon a tractor door, such as the driver's entrance door 12, holes will be drilled to accommodate the fastening screws 54 and, thereafter, the two brackets 38 and 40 are applied to the door. The U-shaped yoke 42 may then be attached to the brackets 38 and 40, utilizing the nut and bolt assemblies 52, after which the mirror frame 30 may be mounted on the vertical bight portion 48 of the yoke 42, utilizing the clamping and supporting assemblies 56 and 58. As previously described, in tightening all of the nut and bolt assemblies 52, 36 and 76, an attempt will be made to tighten these assemblies within the manual capabilities of the average driver so that the various adjustments made possible by these assemblies may be effected without undue physical force and, preferably, so that such adjustments may be made with one hand by a driver while his vehicle is in motion. The adjustments should, however, not be so loose that the mirror frame will shift from its adjusted position under gravitational forces or the force of the airstream passing the tractor 16 at high vehicle speeds.

Assuming now that the mirror frame 30 is adjusted as shown in FIGS. 1 and 4 in full lines wherein it is disposed in its fully extended position to accommodate the presence of the trailer 18 behind the tractor 16, and assuming also that the driver of the tractor has dropped off his trailer and now desires to position the mirror frame 30 in its innermost position wherein it is shown in dotted lines in FIG. 1, it is merely necessary for the driver to grasp the mirror frame and pull the same bodily inwardly toward the cab window without appreciably disturbing the orientation of the mirror frame. The mirror will then function in the manner of a pivoted crank handle and apply torque to the two long legs 64 of the L-shaped supports 58 and thus swing the supporting assemblies 56 bodily as units in respective horizontal planes to positions wherein the mirror frame 30 is in its retracted position.

When it is desired to restore the mirror frame 30 to its extended position, a reverse of the above-described operation may be resorted to, the orientation of the mirror frame remaining undisturbed during movement thereof. The mirror frame is capable of assuming any intermediate position between its fully retracted and its fully extended positions.

Final adjustment of the mirror frame 30 for azimuth in either the extended or the retracted position thereof, or in any intermediate position thereof, may be accomplished by the simple expedient of rotating the mirror frame about the common vertical axis of the two nut and bolt assemblies 36. Adjustment for height will not often be made due to the fact that the present mirror frame 30, like most truck mirror frames, is of appreciable vertical height. However, if such an adjustment for height is required, the mirror frame may be "worked" so to speak from one height to a different height by swinging the frame and supporting assemblies 56 and 58 bodily as a unit to-and-fro as previously described while at the same time applying lifting or lowering force to the mirror frame.

An adjustment of the mirror frame 30 for elevation is possible and this is accomplished by manipulation of the mirror frame 30 to cause the upper clamping and supporting assembly 56 to swing in a horizontal plane in a clockwise direction as viewed in FIG. 4, while causing the lower clamping and supporting assembly to swing in a horizontal plane in a counterclockwise direction or, vice versa, depending upon whether a positive or a negative elevational adjustment is desired. In FIG. 6, the mirror is shown in full lines as being adjusted for a slight positive elevation. Steeper elevational adjustments may be attained by sliding the nut and bolt assemblies 36 at the top and bottom of the mirror frame 30 in opposite directions in their respective slots 66 (see FIG. 4).

As previously stated, the nut and bolt assemblies 52 are initially tightened to such a degree that wind pressure will be ineffective to shift the position of the U-shaped yoke 42. Preferably, these nut and bolt assemblies 52 will be tightened so that they will offer a greater degree of frictional movement of the parts which they secure than will the other nut and bolt assemblies 36 and 76. Thus, any manual force applied to the mirror frame 30 tending to swing it about the axis of the vertical bight portion 48 of the bracket 42, or to shift it in azimuth or elevation, will not disturb the position of the yoke 42. However, under certain circumstances, it may be found desirable to swing the yoke 42 about the vertical axes of the two nut and bolt assemblies 52 in order to impart components of fore-and-aft movement to the mirror frame 30. In such an instance, the yoke 42 may be forced to a desired adjustment by the direct application of manual torque thereto.

The various mirror frame positions described above are considered to be the most desirable positions thereof and ones which will satisfy the visual requirements of the driver of the tractor 16 under most normal road conditions. However, numerous other positions of the mirror frame are possible, it being readily perceptible that the mirror frame 30 is capable of moving in an orbital path about the vertical axis of the bight portion 48 of the yoke 42 throughout an entire orbit of 360°. Similarly, the mirror frame itself is capable of substantially 360° rotation about the axis of the two nut and bolt assemblies 36 in any orbital position of the mirror frame, especially when the nut and bolt assemblies 36 are disposed near the distal ends of the slots 66 (see FIG. 7).

The invention is not to be limited to the exact arrangement of parts shown in the accompanying drawings or described in this specification as various changes in the details of construction may be resorted to without departing from the spirit and scope of the invention. Therefore, only insofar as the invention has particularly been pointed out in the accompanying claims is the same to be limited.

Having thus described the invention what I claim as new and desire to secure by Letters Patent is:

1. A rear vision mirror assembly adapted to be attached to and extend outwardly from the driver's entrance door of the cab of a tractor or other automotive vehicle and including a generally rectangular mirror frame movable between an operative retracted position wherein it is close to said door and the setting thereof will accommodate a driver's rear view when the tractor is devoid of a trailer, and an operative extended position wherein it is remote from said door and the setting thereof will accommodate the driver's rear view when a trailer is operatively attached to the tractor, said mirror assembly, in addition to said mirror frame, including a generally C-shaped yoke formed of cylindrical stock and having upper and lower yoke arms and a vertical connecting bight portion, means at the distal ends of said yoke arms for attaching the arms to said entrance door so that the arms extend horizontally while the bight portion extends substantially vertically, said mirror frame being provided at its top and bottom with coaxial trunnion supports, and a pair of radially disposed supporting arms of substantially equal length secured at their inner ends for swinging movement in respective horizontal planes about the axis of said bight portion, said trunnion supports being secured to the outer ends of said supporting arms for rotation of the mirror about the common axis of said trunnion supports, said mirror frame thus being capable of orbital movement about the vertical axis of said bight portion between said extended and retracted positions and being independently rotatable about the axis of said trunnion supports for independent adjustment in azimuth in either of said positions.

2. A rear vision mirror assembly as set forth in claim 1 and including, additionally, means for yieldingly and frictionally clamping the inner ends of said radial supporting arms to the vertical bight portion of said C-shaped yoke to restrain the orbital movement of the mirror frame, and means for yieldingly and frictionally clamping the outer ends of said radial supporting arms to the trunnion supports to restrain the rotational movement of the mirror frame.

3. A rear vision mirror assembly adapted to be attached to and extend outwardly from the driver's entrance door of the cab of a tractor or other automotive vehicle and including a generally rectangular mirror frame movable between an operative retracted position wherein it is close to said door and the setting thereof will accommodate a driver's rear view when the tractor is devoid of a trailer, and an operative extended position wherein it is remote from said door and the setting thereof will accommodate the driver's rear view when a trailer is operatively attached to the tractor, said mirror assembly, in addition to said mirror frame, including a generally C-shaped yoke formed of cylindrical stock and having upper and lower yoke arms and a vertical connecting bight portion, means at the distal ends of said yoke arms for attaching the arms to said entrance door so that the arms extend horizontally while the bight portion extends substantially vertically, said mirror frame being provided at its top and bottom with coaxial trunnion supports in the form of nut and bolt assemblies, and a pair of radially disposed supporting arms of substantially equal length extending between said trunnion supports and the vertical bight portion of said C-shaped yoke for supporting the mirror frame from said bight portion for orbital movement about the vertical axis of the bight portion for movement between said extended and retracted positions and for independent rotation about the common axis of said trunnion supports for independent adjustment in azimuth in either of said positions, the outer ends of said radially disposed arms being yieldingly clamped by said nut and bolt assemblies which constitute the trunnion supports, the inner ends of said radially disposed arms being provided with split clamping means yieldingly and frictionally encompassing said bight portion, and nut and bolt assemblies effective to tighten said split clamping means against said bight portion.

4. A rear vision mirror as set forth in claim 3 and wherein the outer end portions of said radially disposed supporting arms are provided with radially elongated slots therein through which the bolt portions of said nut and bolt assemblies which comprise the trunnion supports extend and along which slots the nut and bolt assemblies are adjustable to permit independent adjustment of the mirror frame in elevation.

References Cited by the Examiner

UNITED STATES PATENTS

| | | | |
|---|---|---|---|
| 2,708,086 | 5/1955 | Prutzman | 248—205 |
| 2,783,015 | 2/1957 | Kampa | 248—279 |
| 2,849,920 | 9/1958 | Morgenstern | 88—98 |
| 2,969,715 | 1/1961 | Mosby | 88—98 |
| 3,189,309 | 6/1965 | Hager | 248—279 |

CLAUDE A. LE ROY, *Primary Examiner.*

K. J. WINGERT, *Assistant Examiner.*